(12) United States Patent
Chen et al.

(10) Patent No.: US 10,037,345 B2
(45) Date of Patent: Jul. 31, 2018

(54) CLUSTERING METHOD AND DEVICE

(71) Applicant: Xiaomi Inc., Beijing (CN)

(72) Inventors: Zhijun Chen, Beijing (CN); Tao Zhang, Beijing (CN); Bo Zhang, Beijing (CN); Lin Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 940 days.

(21) Appl. No.: 14/532,271

(22) Filed: Nov. 4, 2014

(65) Prior Publication Data

US 2015/0261845 A1 Sep. 17, 2015

Related U.S. Application Data

(63) Continuation of application No. PCT/CN2014/082876, filed on Jul. 24, 2014.

(30) Foreign Application Priority Data

Mar. 14, 2014 (CN) .......................... 2014 1 0097422

(51) Int. Cl.
*G06F 7/00* (2006.01)
*G06F 17/00* (2006.01)
*G06F 17/30* (2006.01)

(52) U.S. Cl.
CPC ................ *G06F 17/3028* (2013.01)

(58) Field of Classification Search
CPC ......... G06F 17/30598; G06F 17/30345; G06F 17/30256; G06F 17/30268; G06F 17/3028; G06F 17/30115
USPC ........................................................ 707/609
See application file for complete search history.

(56) References Cited

U.S. PATENT DOCUMENTS

| 2006/0251292 | A1 | 11/2006 | Gokturk et al. |
| 2008/0063276 | A1* | 3/2008 | Vincent .................... G06K 9/03 382/182 |
| 2008/0310759 | A1* | 12/2008 | Liu .................... G06K 9/00241 382/294 |

(Continued)

FOREIGN PATENT DOCUMENTS

| CN | 103473255 | 12/2013 |
| CN | 103914518 | 7/2014 |

(Continued)

OTHER PUBLICATIONS

International Search Report of PCT/CN2014/082876, mailed from the State Intellectual Property Office of China dated Dec. 22, 2014.

(Continued)

*Primary Examiner* — Binh Van Ho
(74) *Attorney, Agent, or Firm* — Finnegan, Henderson, Farabow, Garrett & Dunner LLP

(57) ABSTRACT

A clustering method for applying to a plurality of classes each including one or more images as objects, includes: performing an iterative merge on the classes according to inter-class Rank-Order distances; obtaining an intra-class convergence degree of each class obtained by the iterative merge, based on inter-object distances in the class; and grouping, for each class obtained by the iterative merge, objects in the class that have a distance smaller than the intra-class convergence degree of the class into a new class, thereby to perform an update on the classes.

13 Claims, 9 Drawing Sheets

(56) References Cited

U.S. PATENT DOCUMENTS

| | | | | |
|---|---|---|---|---|
| 2009/0119585 A1* | 5/2009 | Sakuyama | ......... | H04N 1/00442 |
| | | | | 715/273 |
| 2011/0150340 A1* | 6/2011 | Gotoh | ............... | G06F 17/30247 |
| | | | | 382/190 |
| 2012/0294540 A1* | 11/2012 | Sun | .................... | G06F 17/30247 |
| | | | | 382/225 |
| 2012/0321193 A1 | 12/2012 | Ukil et al. | | |
| 2013/0070986 A1* | 3/2013 | Peleg | .................... | G06K 9/6254 |
| | | | | 382/128 |
| 2013/0279816 A1 | 10/2013 | Zhang et al. | | |
| 2014/0032583 A1* | 1/2014 | Ioffe | ................. | G06F 17/30274 |
| | | | | 707/758 |

FOREIGN PATENT DOCUMENTS

| | | |
|---|---|---|
| JP | H 10171823 A | 6/1998 |
| KR | 20090021809 A | 3/2009 |
| RU | 2345414 C1 | 1/2009 |
| TW | 201407390 | 2/2014 |
| WO | WO 2011/118723 A1 | 9/2011 |

OTHER PUBLICATIONS

Chunhui Zhu et al., "A Rank-Order Distance Based Clustering Algorithm for Face Tagging", Computer vision and Pattern Recognition (CVPR), 2011 IEEE Conference, Jun. 20, 2011, pp. 481-488, 8 pages.

Alexandros Nanopouls et al, "$C^2P$: Clustering Based on Closet Pair," Proceedings of the Twenty-seventh International Conference on Very Large Data Bases, Roma, Sep. 11-14, 2011, pp. 331-340, 10 pages.

Charu C. Aggarwal: "Outlier Analysis," Jan. 1, 2013, Springer, pp. 101-133, 34 pages.

Markus M. Breunig et al., "LOF: Identifying Density-Based Local Outliers," Proceedings of the 2000 ACM SIGMOND Int. Conf. on Management of Data, May 16, 2000, pp. 93-104, 12 pages.

European Search Report received from European Patent Office for European Application No. 14199432.7, dated Nov. 24, 2015, 13 pages.

English translation of International Search Report for International Application No. PCT/CN2014/082876, dated Dec. 12, 2014, 2 pages.

* cited by examiner

CLUSTERING METHOD AND DEVICE

CROSS-REFERENCE TO RELATED APPLICATIONS

This application is a continuation of International Application No. PCT/CN2014/082876, filed Jul. 24, 2014, which is based upon and claims priority to Chinese Patent Application No. CN201410097422.5, filed Mar. 14, 2014, the entire contents of all of which are incorporated herein by reference.

TECHNICAL FIELD

The present disclosure generally relates to the field of computer technology and, more particularly, to a clustering method and device.

BACKGROUND

Clustering is a process of grouping a set of objects into a plurality of classes each composed of similar objects, that is, a process of classifying objects into different classes (clusters), such that objects in the same class have a relatively large similarity, and objects in different classes have a relatively large dissimilarity. In this context, "class" and "cluster" have the same meaning, as used herein.

A conventional clustering method can be used to classify human face images, so as to classify images of a same person into one class. A Rank-Order distance can be used in the conventional clustering method to measure a similarity between two human faces in images, and images of the same person can be clustered together. However, if a number of faces contained in a group of images is relatively large, and the number of images of each person is relatively small, accuracy of clustering results by the conventional clustering method can be low.

SUMMARY

According to a first aspect of the present disclosure, there is provided a clustering method for applying to a plurality of classes each including one or more images as objects, comprising: performing an iterative merge on the classes according to inter-class Rank-Order distances; obtaining an intra-class convergence degree of each class obtained by the iterative merge, based on inter-object distances in the class; grouping, for each class obtained by the iterative merge, objects in the class that have a distance smaller than the intra-class convergence degree of the class into a new class, thereby to perform an update on the classes; if a number of the classes after the update is smaller than a number of the classes before the update, repeating the performing of the iterative merge, the obtaining, and the grouping, until the numbers of the classes before and after an update are the same, to obtain a clustering result, the clustering result including one or more classes each containing a plurality of objects and one or more classes each containing a single object.

According to a second aspect of the present disclosure, there is provided a clustering device for applying to a plurality of classes each including one or more images as objects, comprising: a processor; and a memory for storing instructions executable by the processor; wherein the processor is configured to: perform an iterative merge on the classes according to inter-class Rank-Order distances; obtain an intra-class convergence degree of each class obtained by the iterative merge, based on inter-object distances in the class; group, for each class obtained by the iterative merge, objects in the class that have a distance smaller than the intra-class convergence degree of the class into a new class, thereby to perform an update on the classes; if a number of the classes after the update is smaller than a number of the classes before the update, repeat the performing of the iterative merge, the obtaining, and the grouping, until the numbers of the classes before and after an update are the same, to obtain a clustering result, the clustering result including one or more classes each containing a plurality of objects and one or more classes each containing a single object.

According to a third aspect of the present disclosure, there is provided a non-transitory computer-readable storage medium having stored therein instructions that, when executed by a processor of a device, cause the device to perform a clustering method on a plurality of classes each including one or more images as objects, the clustering method comprising: performing an iterative merge on the classes according to inter-class Rank-Order distances; obtaining an intra-class convergence degree of each class obtained by the iterative merge based on inter-object distances in the class; grouping, for each class obtained by the iterative merge, objects in the class that have a distance smaller than the intra-class convergence degree of the class into a new class, thereby to perform an update on the classes; if a number of the classes after the update is smaller than a number of the classes before the update, repeating the performing of the iterative merge, the obtaining, and the grouping until the numbers of the classes before and after an update are the same, to obtain a clustering result, the clustering result including one or more classes each containing a plurality of objects and one or more classes each containing a single object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the disclosure as recited in the appended claims.

Figure 1:
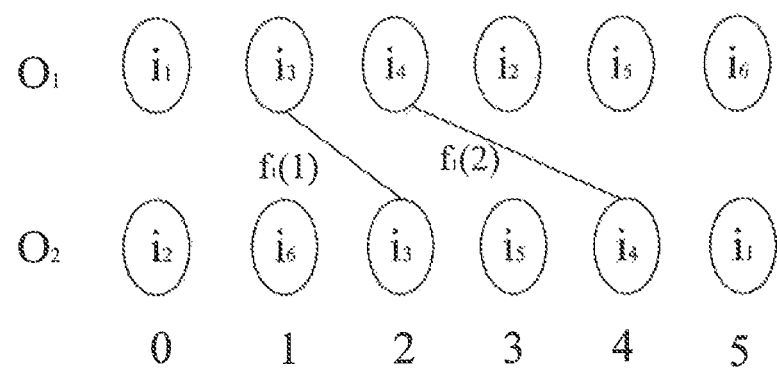
FIG. 1 is a schematic view of a plurality of objects being ranked into a sequence, according to an exemplary embodiment.

In exemplary embodiments, there is provided a clustering method based on distances, such as Rank-Order distances (e.g., cosine similarities, Euclidean distances, etc.,) between objects, such as images. The distances are calculated to measure similarities between the objects, and the objects are ranked according to magnitudes of the distances so as to obtain a sequence. For example, assuming that there are n objects, respectively $i_1, i_2, i_3, i_4, i_5, i_6, \ldots i_n$, if the object $i_1$ is taken as a reference object, a distance between each of the other objects and the object $i_1$ is calculated, and the objects are ranked according to magnitudes of the distances, so as to obtain, e.g., a sequence $O_1$ shown in FIG. 1. If the object $i_2$ is taken as a reference object, a distance between each of the other objects and the object $i_2$ is calculated, so as to obtain, e.g., a sequence $O_2$ shown in FIG. 1.

In exemplary embodiments, an asymmetric Rank-Order distance $D(i_1, i_2)$ between the objects $i_1$ and $i_2$ is calculated according to sequence numbers of the objects in the sequence $O_2$ that are neighbor objects between the objects $i_1$ and $i_2$ in the sequence $O_1$. Specifically, in the example shown in FIG. 1, the sequence numbers of the objects $i_1, i_3, i_4$ and $i_2$ in the sequence $O_2$ are respectively 5, 2, 4, and 0. Accordingly, $D(i_1, i_2)$ is calculated according to equation (1) as follows:

$$D(i_1, i_2) = \sum_{x=0}^{O_1(i_2)} O_2(f_1(X)) =$$

$$O_2(i_1) + O_2(i_3) + O_2(i_4) + O_2(i_2) = 5 + 2 + 4 + 0 = 11.$$

equation (1)

In equation (1), $O_2(i_1)$ represents the sequence number of the object $i_1$ in the sequence $O_2$, $O_2(i_3)$ represents the sequence number of the object $i_3$ in the sequence $O_2$, $O_2(i_4)$ represents the sequence number of the object $i_4$ in the sequence $O_2$, and $O_2(i_2)$ represents the sequence number of the object $i_2$ in the sequence $O_2$.

Similarly, an asymmetric Rank-Order distance $D(i_2, i_1)$ between the objects $i_1$ and $i_2$ is calculated. Then, a normalized Rank-Order distance $D^R(i_1, i_2)$ between the objects $i_1$ and $i_2$ is calculated according to equation (2) as follows:

$$D^R(i_1, i_2) = \frac{D(i_1, i_2) + D(i_2, i_1)}{\min(O_1(i_2), O_2(i_1))}.$$

equation (2)

$D^R(i_1, i_2)$ represents a normalized inter-object Rank-Order distance. Calculation of an inter-class Rank-Order distance is similar to the calculation of an inter-object Rank-Order distance. For example, a class is taken as a reference class, and classes are ranked according to distances between each of other classes and the reference class. In one exemplary embodiment, the inter-class Rank-Order distance is calculated according to equation (3) as follows:

$$D(C_i, C_j) = \min \, d(a,b) \forall a \in C_i, b \in C_j$$

equation (3).

In equation (3), $C_i$ and $C_j$ each represent a class.

A normalized inter-class Rank-Order distance is further calculated according to equation (4) as follows:

$$D^R(C_i, C_j) = \frac{D(C_i, C_j) + D(C_j, C_i)}{\min(O_{C_i}(C_j), O_{C_j}(C_i))}.$$

equation (4)

In equation (4), $D(C_i, C_j)$ represents an asymmetric inter-class Rank-Order distance between the classes $C_i$ and $C_j$; $D(C_j, C_i)$ represents an asymmetric inter-class Rank-Order distance between the classes $C_j$ and $C_i$; $O_{C_i}(C_j)$ represents a sequence number of the class $C_j$ in a sequence taking $C_i$ as a reference class; and $O_{C_j}(C_i)$ represents a sequence number of the class $C_i$ in a sequence taking $C_j$ as a reference class.

In exemplary embodiments, a normalized inter-class Rank-Order distance $D^N(C_i, C_j)$ between the classes $C_i$ and $C_j$ is calculated based on a distance $d(C_i, C_j)$ according to equations (5) as follows:

$$D^N(C_i, C_j) = \frac{1}{\phi(C_i, C_j)} \cdot d(C_i, C_j),$$

$$\phi(C_i, C_j) = \frac{1}{|C_i| + |C_j|} \sum_{a \in C_i \cup C_j} \frac{1}{K} \sum_{k=1}^{K} d(a, f_a(k)).$$

equations (5)

In equations (5), $d(C_i, C_j)$ represents a distance between the classes $C_i$ and $C_j$; $|C_i|$ and $|C_j|$ each represent a number of objects in a class; $K$ is a constant; $f_a(k)$ represents a $k^{th}$ neighbor object of an object $a$; and $\phi(C_i, C_j)$ represents an average distance between the K objects that are most close to the classes $C_i$ or $C_j$.

In exemplary embodiments, each human face image can be considered an object and, through the clustering method provided in the present disclosure, images of a same person can be clustered together as one cluster. Characters in a human face image are transformed into a group of vectors. Thus, inter-object distances are distances between the vectors. The clustering method provided in the present disclosure may also be applied to other types of data.

Figure 2:
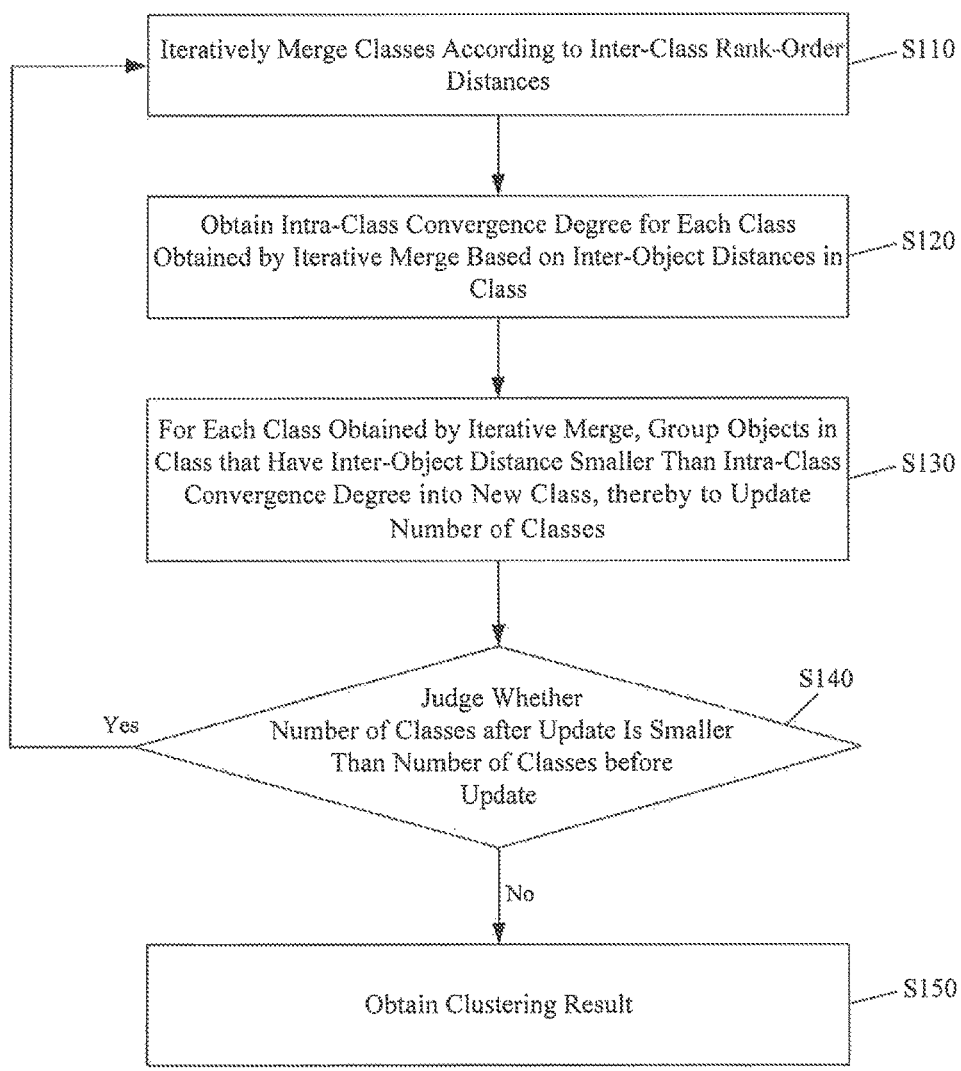
FIG. 2 is a flowchart of a clustering method, according to an exemplary embodiment.

FIG. 2 is a flowchart of a clustering method 100, according to an exemplary embodiment. In the embodiment, the clustering method 100 is applied in a terminal. Referring to FIG. 2, the method 100 includes the following steps.

In step S110, the terminal iteratively merges classes according to inter-class Rank-Order distances. Each of the classes includes, e.g., one or more human face images.

For example, the terminal calculates Rank-Order distances between every two classes, and merges classes having a Rank-Order distance smaller than a first distance threshold. The first distance threshold may be predetermined according to a type of data, or predetermined according to experimental results.

Figure 3:
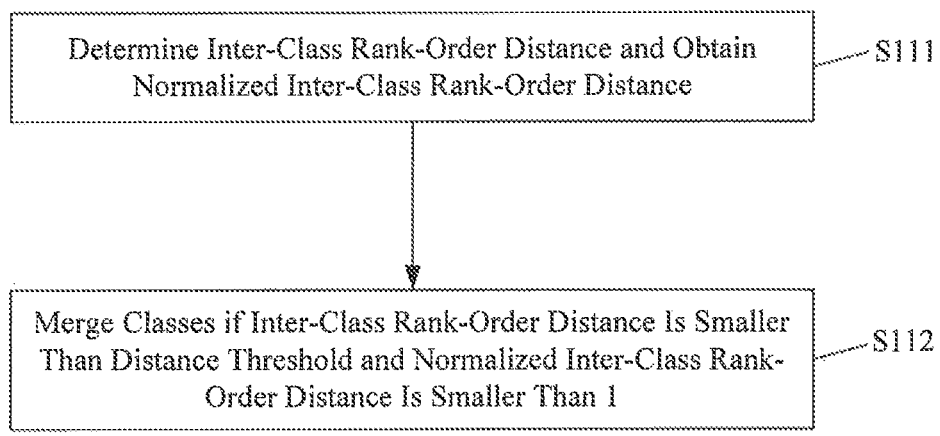
FIG. 3 is a flowchart of a clustering method, according to an exemplary embodiment.

FIG. 3 is a flowchart of substeps in step S110 (FIG. 2) for merging two classes $C_i$ and $C_j$, according to an exemplary embodiment. Referring to FIG. 3, step S110 includes the following substeps.

In substep S111, the terminal determines an inter-class Rank-Order distance between the classes $C_i$ and $C_j$, and normalizes the inter-class Rank-Order distance to obtain a normalized inter-class Rank-Order distance.

For example, assuming that initially a number of human face images is N, and each human face image is taken as one individual class, then a number of the classes is N initially. Also, a distance threshold t and a constant K are set. For any two classes $C_i$ and $C_j$, a Rank-Order distance $D^R(C_i,C_j)$ between the classes and a normalized Rank-Order distance $D^N(C_i,C_j)$ between the classes are obtained by calculating according to the above equations (1)-(5). The number of the classes is N initially, and thus an N×N matrix of $D^R(C_i,C_j)$ and an N×N matrix of $D^N(C_i,C_j)$ are obtained. In the matrix of $D^R(C_i,C_j)$, each element, also known as a vector, represents a Rank-Order distance between the corresponding classes. For example, in the matrix of $D^R(C_i,C_j)$, $C_{ij}$ represents the Rank-Order distance between the classes $C_i$ and $C_j$, and in the matrix of $D^N(C_i,C_j)$, $C_{ij}$ represents a normalized Rank-Order distance between the classes $C_i$ and $C_j$.

In step S112, if the inter-class Rank-Order distance is smaller than the distance threshold t, and the normalized inter-class Rank-Order distance is smaller than 1, the terminal merges the classes $C_i$ and $C_j$.

For example, if $D^R(C_i,C_j)<t$, and $D^N(C_i,C_j)<1$, it is determined that a similarity between the class $C_i$ and $C_j$ is large, that is, the class $C_i$ and $C_j$ are candidate classes to be merged. Also for example, if $D^R(C_i,C_j) \geq t$, it indicates that a similarity between the classes $C_i$ and $C_j$ is small; and if $D^N(C_i,C_j) \geq 1$, it indicates that a discrete degree between the classes $C_i$ and $C_j$ is large.

Referring to back to FIG. 2, in step S120, the terminal obtains an intra-class convergence degree for each class obtained by the iterative merge based on inter-object distances in the class.

Figure 4:
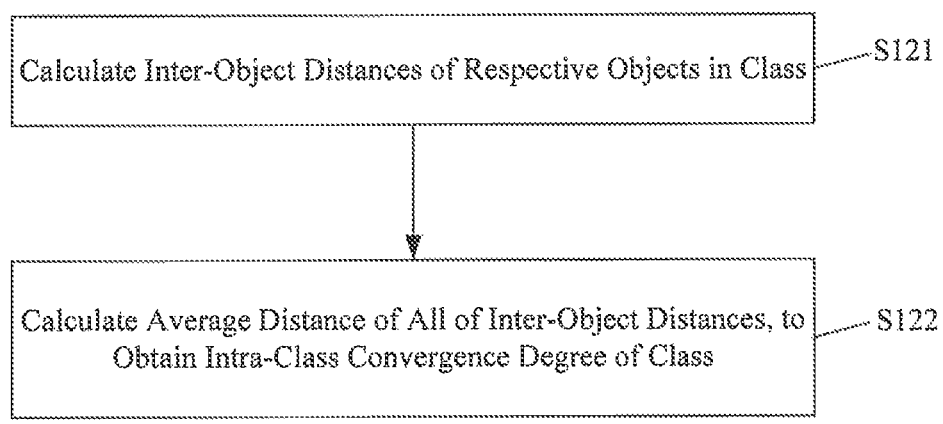
FIG. 4 is a flowchart of a clustering method, according to an exemplary embodiment.

FIG. 4 is a flowchart of substeps in step S120 (FIG. 2) for obtaining an intra-class convergence degree for a class obtained by the iterative merge, according to an exemplary embodiment. Referring to FIG. 4, step S120 includes the following substeps.

Referring to FIG. 4, in substep S121, the terminal calculates inter-object distances of respective objects in the class. For example, an inter-object distance can be calculated based on a cosine similarity, an Euclidean distance, a Jaccard distance, etc.

In one exemplary embodiment, when the inter-object distance is calculated based on the cosine similarity, e.g., cos θ, the inter-object distance is defined as 1−cos θ. Thus, in the embodiment, the smaller the inter-object distance is, the larger the similarity between the objects will be.

In substep S122, the terminal calculates an average distance of all of the inter-object distances, to obtain an intra-class convergence degree of the class.

For example, assuming that there are n objects in the class, an n×n distance matrix d can be obtained according to distances between every two objects in the class. In the matrix d, each element, also known as a vector, indicates a distance between two corresponding objects. For example, a vector $d_{ij}$ in the matrix d represents a distance between an $i^{th}$ object and a $j^{th}$ object in the class. Step S122 is performed to calculate an average d_aver of all of the vectors in the matrix d.

Figure 5:
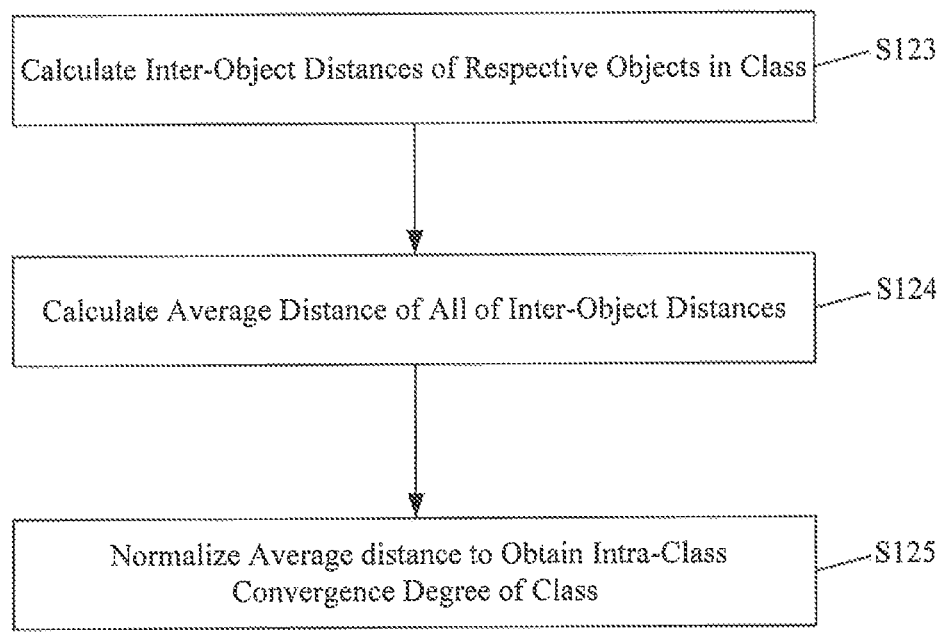
FIG. 5 is a flowchart of a clustering method, according to an exemplary embodiment.

FIG. 5 is a flowchart of substeps in step S120 (FIG. 2) for calculating an intra-class convergence degree for a class obtained by the iterative merge, according to another embodiment of the present disclosure. Referring to FIG. 5, step S120 includes the following substeps.

In substep S123, the terminal calculates inter-object distances of respective objects in the class.

In substep S124, the terminal calculates an average distance d_aver of all of the inter-object distances according to the inter-object distances.

In substep S125, the terminal normalizes the average distance d_aver to obtain the intra-class convergence degree of the class.

By the normalization of the average distance d_aver, the average distance d_aver is inducted into a predetermined range [dleft, dright], in which dleft and dright are each a predetermined threshold. For example, dleft may be predetermined to be 0.6, and dright may be predetermined to be 0.75. In one exemplary embodiment, the normalization may be performed according to equation (6) as follows:

$$d\_aver = \begin{cases} dleft, & \text{if } d\_aver < dleft \\ dright, & \text{if } d\_aver > dright \\ d\_aver, & \text{if } dleft \leq d\_aver \leq dright \end{cases} \quad \text{equation (6)}$$

In the above example, if the average distance d_aver is calculated to be 0.5, the intra-class convergence degree obtained after the normalization is 0.6; if the average distance d_aver is calculated to be 0.65, the intra-class convergence degree after the normalization is 0.65; and if the average distance d_aver is calculated to be 0.78, the intra-class convergence degree after the normalization is 0.75.

In exemplary embodiments, the intra-class convergence degree is measured by a value of 1−cos θ to indicate the similarity. Therefore, the smaller the intra-class convergence degree is, the more convergent the objects within the class are and the more similar the objects within the class there are. The intra-class convergence degree is normalized into a range of, for example, [0.6, 0.75]. When the intra-class convergence degree is in the range of normalization, the objects within the class are grouped according to the intra-class convergence degree. When the intra-class convergence degree is out of the range of normalization, the objects within the class are grouped according to the threshold.

Referring back to FIG. 2, in step S130, for each class obtained by the iterative merge, the terminal groups objects in the class that have an inter-object distance smaller than the intra-class convergence degree into a new class, thereby to update the number of the classes.

For example, for each class obtained by the iterative merge according to Rank-Order distances, the class is divided according to the inter-object distances in the class and the intra-class convergence degree. Accordingly, one iteration is completed, and then step S140 is performed.

Figure 6:
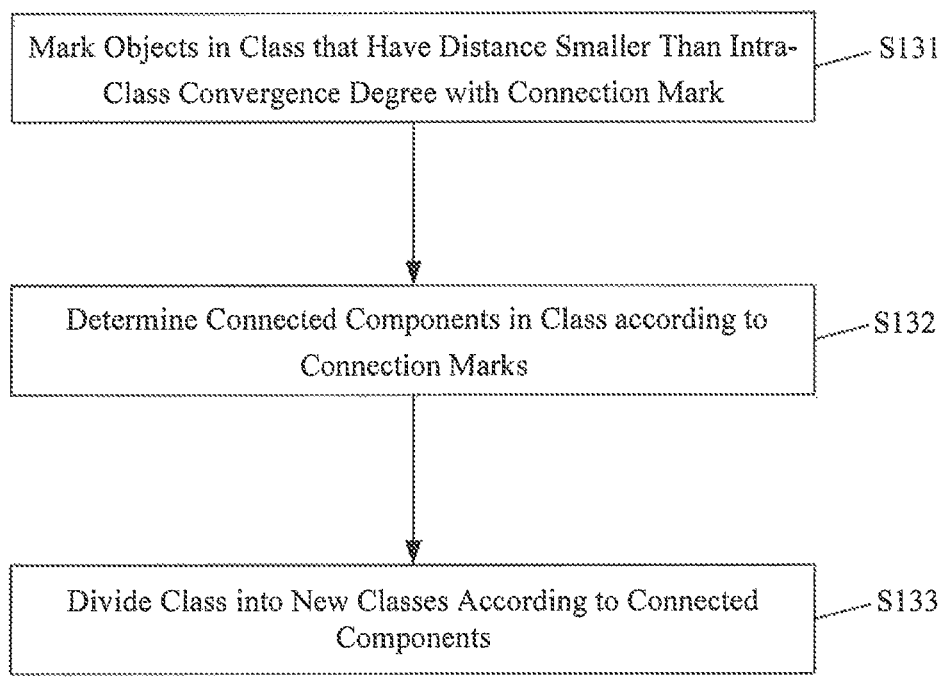
FIG. 6 is a flowchart of a clustering method, according to an exemplary embodiment.

FIG. 6 is a flowchart of substeps in step S130 (FIG. 2) for grouping objects in a class that have an inter-object distance smaller than an intra-class convergence degree of the class, according to an exemplary embodiment. Referring to FIG. 6, step S130 includes the following substeps.

In substep S131, the terminal marks the objects in the class that have a distance smaller than the intra-class convergence degree with a connection mark.

For example, for any object within the class, the terminal checks whether a distance between the object and any other object within the class in the distance matrix is smaller than the intra-class convergence degree. If the inter-object distance is smaller than the intra-class convergence degree, it indicates that similarity between the corresponding objects is large, and the objects may be grouped into one class. The two objects associated with the distance may be given a connection mark. For example, if a distance $d_{ij}$ between two human face images corresponding to an $i^{th}$ object and a $j^{th}$ object, respectively, is smaller than the intra-class convergence degree, the $i^{th}$ object and the $j^{th}$ object are connected.

If the inter-object distance in the class is greater than the intra-class convergence degree, it indicates that similarity between the corresponding objects is small, and it is not appropriate to group the objects into one class. Therefore, the objects are not marked.

In step S132, the terminal determines connected components within the class according to the connection marks. For example, objects that can be connected are taken as a connected component. Thereby, the terminal determines how many connected components that all of the objects within the class can be grouped into.

In step S133, the terminal divides the class into new classes according to the connected components, thereby to update the number of the classes.

For example, objects corresponding to each connected component are grouped into one new class, that is, the original class is divided into as many new classes as the number of the connected components contained in one class, and the number of classes increases accordingly. By dividing a class according to connected components, objects that do not belong to the class may be removed from the class, that is, the discrete objects are removed from the cluster.

Referring back to FIG. 2, in step S140, the terminal judges whether the number of classes after the update is smaller than the number of classes before the update. If so, the process returns to step S110; otherwise, step S150 is performed.

In one exemplary embodiment, if the number of the classes after the update is smaller than the number of the classes before the update, the process returns to step S110, until the numbers of the classes are the same before and after an update.

In the illustrated embodiment, as one iteration, the classes are merged based on Rank-Order distances, and then each class obtained by the merge is divided into new classes. For example, assuming that the number of classes is 6 before a merge, and is changed into 4 after a merge based on Rank-Order distances, then the 4 classes after the merge are regrouped into 5 classes. In this embodiment, the number of the classes after the update is 5, the number of the classes before the update is 6. Therefore, the number after the update is smaller than the number before the update, and the process returns to step S110 to repeat an iteration.

If the number of the classes after the update is smaller than the number of the classes before the update, it indicates that the intra-class discrete degree is large, that is, the objects within the class are not sufficiently convergent. Therefore, the iterative merge should be continually performed on the classes, and the classes after the iterative merge are further divided, until the number of the classes after the update is not greater than the number of the classes before the update.

When the numbers of the classes are the same before and after an update, in step S150, the terminal obtains a clustering result. The clustering result can include one or more classes each containing a plurality of objects and/or one or more classes each containing a single object. The objects within a class containing a plurality of objects can be human face images of a same person. The single object in a class containing the single object is a discrete object removed from a class after an iterative merge based on a Rank-Order distance.

In the clustering method 100, the classes are merged based on Rank-Order distances, a similarity between two objects are then measured based on inter-object distances within a class, and an object with a smaller similarity (a larger dissimilarity) is further removed from the class (or form a new class). When a number of objects in a data set is relatively large, and a number of objects that belong to a same class is relatively small, the clustering method 100 can achieve an accurate clustering result.

Table 1 below shows exemplary clustering results of the clustering method according to the present disclosure using experimental data compared to those of the conventional method based only on Rank-Order distances.

TABLE 1

|  | Number of Human Faces in All Images | Number of Different Persons in All Images | Clustering Results Based only on Rank-Order Distances | | | Clustering Results of Clustering Method According to Present Disclosure | | |
| --- | --- | --- | --- | --- | --- | --- | --- | --- |
|  |  |  | P | R | CR | P | R | CR |
| Case 1 | 2291 | 562 | 0.861 | 0.78 | 4.20 | 0.991 | 0.66 | 4.25 |
| Case 2 | 241 | 35 | 0.84 | 0.76 | 3.95 | 1 | 0.65 | 3.5 |
| Case 3 | 378 | 6 | 0.98 | 0.90 | 7.7 | 1 | 0.80 | 6.1 |

In Table 1, P represents an accuracy rate of a clustering result, R represents a recall rate of a clustering result, and CR represents an average number of human face images in each class in a clustering result.

It can be seen from Table 1 that, in case 1, the images include 2291 human faces, and 562 different persons. On the average, each person corresponds to 4.07 human face images. That is, in all of the images, an average of 4.07 human face images belong to a same person. Accordingly, in the clustering result using the conventional method based only on Rank-Order distances, the accuracy rate is 86.1%, and the accuracy rate of the clustering method according to the present disclosure is 99.1%, which is much higher than the accuracy rate of the conventional clustering method. In case 2 and case 3, the accuracy rates of the clustering method according to the present disclosure are also higher than the accuracies of the conventional clustering method.

Figure 7:
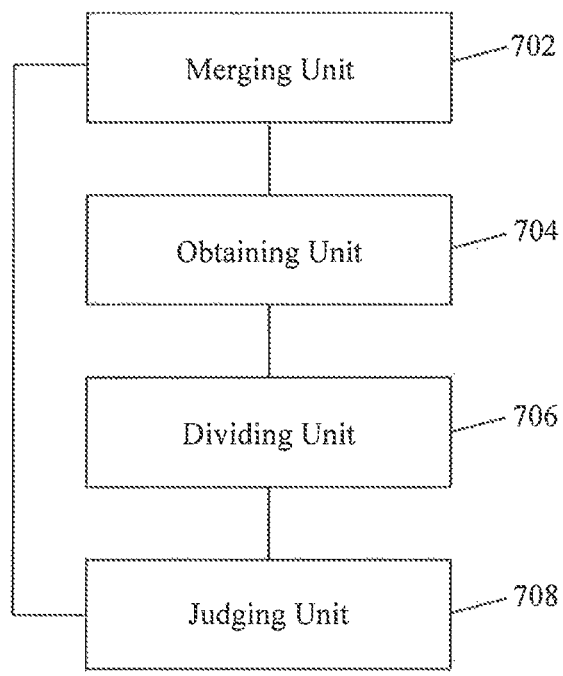
FIG. 7 is a block diagram of a clustering device, according to an exemplary embodiment.

FIG. 7 is a block diagram of a clustering device 700, according to an exemplary embodiment. Referring to FIG. 7, the device 700 includes a merging unit 702, an obtaining unit 704, a dividing unit 706, and a judging unit 708.

The merging unit 702 is configured to iteratively merge classes according to inter-class Rank-Order distances.

In one exemplary embodiment, the merging unit 702 includes an obtaining subunit and a merging subunit. The obtaining subunit is configured to obtain inter-class Rank-Order distances and normalized inter-class Rank-Order distances. The merging subunit is configured to merge the classes when an inter-class Rank-Order distance is smaller than a distance threshold and a normalized inter-class Rank-Order distance is smaller than 1.

The obtaining unit 704 is configured to obtain an intra-class convergence degree for each class obtained by the iterative merge based on the inter-object distances in the class.

In one exemplary embodiment, the obtaining unit 702 includes an obtaining subunit and a calculating subunit. The obtaining subunit is configured to obtain inter-object distances in the class. The calculating subunit is configured to calculate an average distance of all of the inter-object distances in the class, to obtain the intra-class convergence degree of the class.

In another embodiment, the obtaining unit 704 further includes a normalization subunit. The normalization subunit is configured to normalize the average distance to obtain the intra-class convergence degree of the class.

The dividing unit 706 is configured to, for each class obtained by the iterative merge, group objects in the class that have an inter-object distance smaller than the intra-class convergence degree into a new class, thereby to update the number of the classes.

In one exemplary embodiment, the dividing unit 706 includes a judging subunit, a marking subunit, a determining subunit, and a dividing subunit. The judging subunit is configured to judge whether an inter-object distance within the class is smaller than the intra-class convergence degree. The marking subunit is configured to mark the objects in the class which have an inter-object distance smaller than the intra-class convergence degree with a connection mark. The determining subunit is configured to determine connected components in the class according to connection marks. The dividing subunit is configured to divide the class into new classes according to the connected components, thereby to update the number of the classes.

The judging unit 708 is configured to judge whether the number of the classes after the update is smaller than the number of the classes before the update. If the number of the classes after the update is smaller than the number of the classes before the update, the merging unit 702 iteratively merges the classes according to inter-class Rank-Order distances, until the numbers of the classes are the same before and after an update. At this time, a clustering result is obtained, and the clustering result includes one or more classes each containing a plurality of objects and/or one or more classes each containing a single object.

When a number of objects in a data set is relatively large, and a number of objects that belong to a same class is relatively small, the device 700 can achieve an accurate clustering result.

Figure 8:
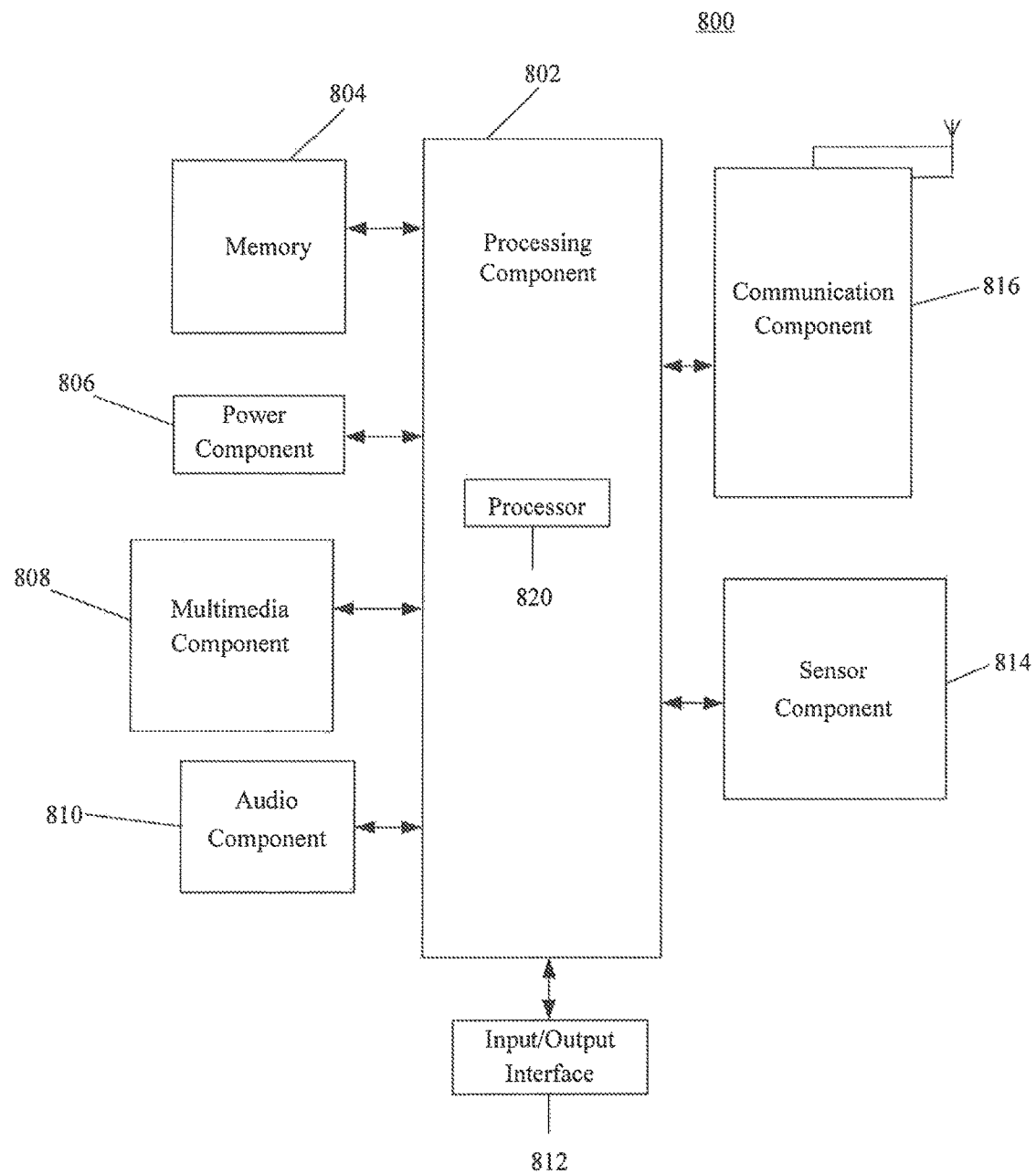
FIG. 8 is a block diagram of a terminal, according to an exemplary embodiment.

In exemplary embodiments, the above described cluster methods can be used in a terminal or a server. FIG. 8 is a block diagram of a terminal 800, according to an exemplary embodiment. For example, the terminal 800 may be a mobile phone, a computer, a digital broadcast terminal, a message transceiver device, a game console, a tablet device, a medical equipment, fitness equipment, a personal digital assistant, and the like.

Referring to FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phone-book data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like.

The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

Figure 9:
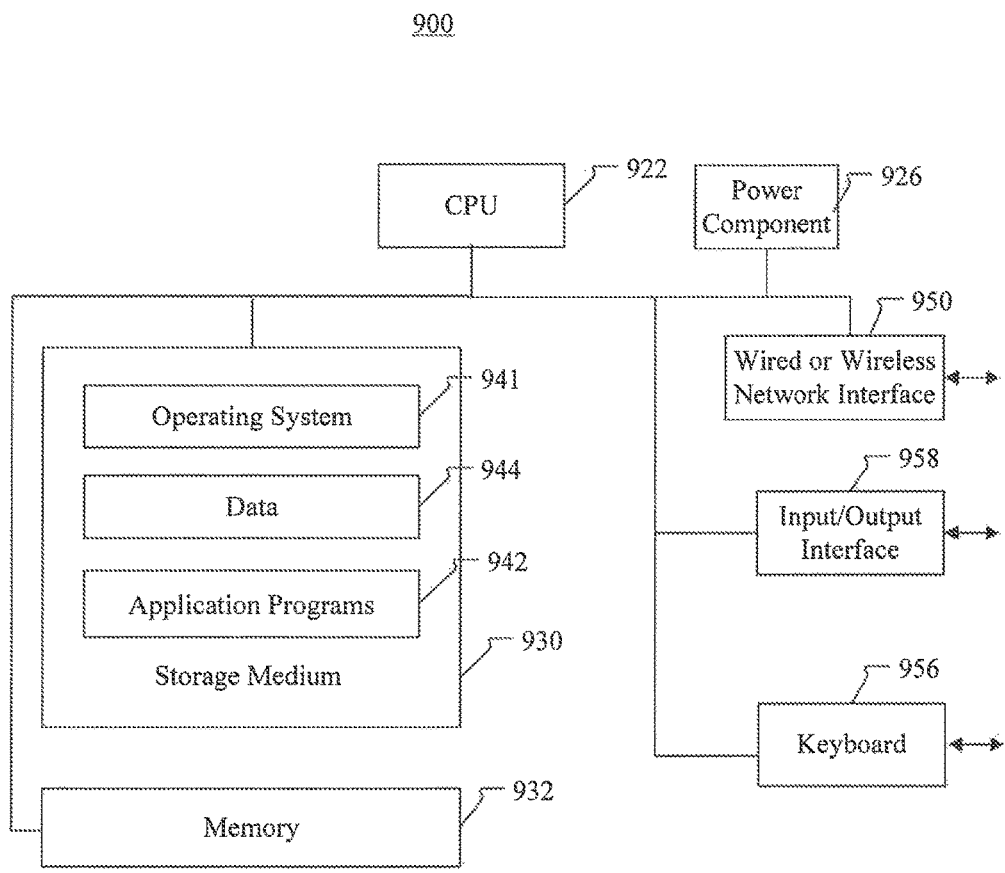
FIG. 9 is a block diagram of a server, according to an exemplary embodiment.

FIG. 9 is a block diagram of a server 900, according to an embodiment. Referring to FIG. 9, the server 900 may include one or more of the following components: a central processing units (CPU) 922 including one or more processors, a memory 932, a storage medium 930, for example, one or more mass storage devices, for storing an operating system 941, application programs 942, and/or data 944. The application programs stored in the storage medium 930 may include one or more modules each corresponding to a set of instructions. Further, the CPU 922 is configured to communicate with the storage medium 930 and execute the set of instructions in the storage medium 930 on the server 900.

The server 900 may also include a power component 926, a wired or wireless network interface 950, and an input/output interface 958, and a keyboard 956. The operating system 941 can be Windows Server™, Mac OS X™, Unix™, Linux™, FreeBSD™, and the like.

In exemplary embodiments, there is also provided a non-transitory computer-readable storage medium including instructions, such as included in the memory 932 or the storage medium 930, executable by the processor 922, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described units/subunits can each be implemented by hardware, or software, or a combination of hardware and software. One of ordinary skill in the art will also understand that multiple ones of the above described units/subunits may be combined as one unit/subunit, and each of the above described units may be further divided into a plurality of sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A clustering method for applying to a plurality of classes of images, comprising:
    performing, by a processor of a device, an iterative merge on the classes of images according to inter-class Rank-Order distances;
    obtaining, by the processor of the device, an intra-class convergence degree of each class of images obtained by the iterative merge, based on inter-object distances in the class, wherein each class of images includes one or more images as objects;
    grouping, by the processor of the device and for each class of images obtained by the iterative merge, images in the class that have a distance smaller than the intra-class convergence degree of the class into a new class, thereby to perform an update on the classes;
    if a number of the classes after the update is smaller than a number of the classes before the update, repeating the performing of the iterative merge, the obtaining, and the grouping, until the numbers of the classes before and after an update are the same, to obtain a clustering result, the clustering result including one or more classes each containing a plurality of images and one or more classes each containing a single image.

2. The method according to claim 1, wherein the obtaining of the intra-class convergence degree of a first class obtained by the iterative merge comprises:
    obtaining inter-object distances of respective images in the first class; and calculating an average distance of all of the inter-object distances to obtain the intra-class convergence degree of the first class.

3. The method according to claim 1, wherein the obtaining of the intra-class convergence degree of a first class obtained by the iterative merge comprises:
obtaining inter-object distances of respective images in the first class;
calculating an average distance of all of the inter-object distances; and
normalizing the average distance to obtain the intra-class convergence degree of the first class.

4. The method according to claim 2, wherein the grouping of the images for the first class comprises:
marking the images in the first class which have a distance smaller than the intra-class convergence degree with one or more connection marks;
determining connected components in the first class according to the one or more connection marks; and
dividing the first class into a plurality of new classes according to the connected components.

5. The method according to claim 3, wherein the grouping of the images for the first class comprises:
marking the images in the first class which have a distance smaller than the intra-class convergence degree with one or more connection marks;
determining connected components in the first class according to the one or more connection marks; and
dividing the first class into a plurality of new classes according to the connected components.

6. The method according to claim 1, wherein the performing of the iterative merge comprises:
obtaining an inter-class Rank-Order distance between first and second classes of the classes and obtaining a corresponding normalized inter-class Rank-Order distance; and
merging the first and second classes if the inter-class Rank-Order distance before normalization is smaller than a threshold distance and the normalized inter-class Rank-Order distance is smaller than 1.

7. A clustering device for applying to a plurality of classes of images, comprising:
a processor; and
a memory for storing instructions executable by the processor;
wherein the processor is configured to:
perform an iterative merge on the classes of images according to inter-class Rank-Order distances;
obtain an intra-class convergence degree of each class of images obtained by the iterative merge, based on inter-object distances in the class, wherein each class of images includes one or more images as objects;
group, for each class of images obtained by the iterative merge, objects images in the class that have a distance smaller than the intra-class convergence degree of the class into a new class, thereby to perform an update on the classes;
if a number of the classes after the update is smaller than a number of the classes before the update, repeat the performing of the iterative merge, the obtaining, and the grouping, until the numbers of the classes before and after an update are the same, to obtain a clustering result, the clustering result including one or more classes each containing a plurality of images and one or more classes each containing a single image.

8. The device according to claim 7, wherein the processor is further configured to:
obtain inter-object distances of respective images in a first class obtained by the iterative merge; and
calculate an average distance of all of the inter-object distances to obtain an intra-class convergence degree of the first class.

9. The device according to claim 7, wherein the processor is further configured to:
obtain inter-object distances of respective images in a first class obtained by the iterative merge;
calculate an average distance of all of the inter-object distances; and
normalize the average distance to obtain an intra-class convergence degree of the first class.

10. The device according to claim 8, wherein the processor is further configured to:
mark the images in the first class which have a distance smaller than the intra-class convergence degree with one or more connection marks;
determine connected components in the first class according to the one or more connection marks; and
divide the first class into a plurality of new classes according to the connected components.

11. The device according to claim 9, wherein the processor is further configured to:
mark the images in the first class which have a distance smaller than the intra-class convergence degree with one or more connection marks;
determine connected components in the first class according to the one or more connection marks; and
divide the first class into a plurality of new classes according to the connected components.

12. The device according to claim 7, wherein the processor is further configured to:
obtain an inter-class Rank-Order distance between first and second classes of the classes and obtain a corresponding normalized inter-class Rank-Order distance; and
merge the first and second classes if the inter-class Rank-Order distance before normalization is smaller than a threshold distance and the normalized inter-class Rank-Order distance is smaller than 1.

13. A non-transitory computer-readable storage medium having stored therein instructions that, when executed by a processor of a device, cause the device to perform a clustering method on a plurality of classes of images, the clustering method comprising:
performing an iterative merge on the classes according to inter-class Rank-Order distances;
obtaining an intra-class convergence degree of each class of images obtained by the iterative merge based on inter-object distances in the class, wherein each class of images includes one or more images as objects;
grouping, for each class of images obtained by the iterative merge, images in the class that have a distance smaller than the intra-class convergence degree of the class into a new class, thereby to perform an update on the classes;
if a number of the classes after the update is smaller than a number of the classes before the update, repeating the performing of the iterative merge, the obtaining, and the grouping until the numbers of the classes before and after an update are the same, to obtain a clustering result, the clustering result including one or more classes each containing a plurality of images and one or more classes each containing a single image.

* * * * *